US012085667B2

United States Patent
Rauvola et al.

(10) Patent No.: US 12,085,667 B2
(45) Date of Patent: Sep. 10, 2024

(54) PROGRAMMABLE MILLIMETER WAVE RADAR INTEGRATED CIRCUIT

(71) Applicant: HUAWEI TECHNOLOGIES CO., LTD., Guangdong (CN)

(72) Inventors: Roger Rauvola, Plano, TX (US); Nima Razmehr, Plano, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 348 days.

(21) Appl. No.: 17/487,851

(22) Filed: Sep. 28, 2021

(65) Prior Publication Data
US 2022/0018930 A1    Jan. 20, 2022

Related U.S. Application Data

(63) Continuation of application No. PCT/US2019/024938, filed on Mar. 29, 2019.

(51) Int. Cl.
*G01S 7/35*    (2006.01)
*G01S 7/40*    (2006.01)
*G01S 13/34*   (2006.01)

(52) U.S. Cl.
CPC ............ *G01S 7/352* (2013.01); *G01S 7/4021* (2013.01); *G01S 13/342* (2013.01)

(58) Field of Classification Search
None
See application file for complete search history.

(56) References Cited

U.S. PATENT DOCUMENTS

| 2013/0002488 A1* | 1/2013 | Wang ...................... G01S 13/89 342/368 |
| 2018/0183471 A1* | 6/2018 | Lin ......................... G01S 13/348 |
| 2019/0056476 A1* | 2/2019 | Lin ......................... G01S 7/021 |
| 2020/0145039 A1* | 5/2020 | Hageraats ............... H04B 1/40 |

FOREIGN PATENT DOCUMENTS

EP    3444628 A1    2/2019

OTHER PUBLICATIONS

Santra et al., "Short-range multi-mode continuous-wave radar for vital sign measurement and imaging." 2018 IEEE Radar Conference (RadarConf18), Apr. 23, 2018, pp. 0946-0950.

* cited by examiner

*Primary Examiner* — Whitney Moore
(74) *Attorney, Agent, or Firm* — Fish & Richardson P.C.

(57) ABSTRACT

A radar receiver stage on an integrated circuit and a method of processing a received radar signal, are provided. In one aspect, the receiver stage includes a low noise amplifier adapted to be connected to a receiver antenna structure, a first programmable gain amplifier, a first programmable bandpass filter, a second programmable gain amplifier, a second programmable bandpass filter, and a programmable low pass filter. One example method includes selecting a radar system configuration including a system type comprising an FMCW system or a Doppler system, programming at least a first programmable gain amplifier stage to a first gain, programming a first programmable bandpass filter stage to a first center frequency; and programming a programmable low pass filter to a first LPF gain.

16 Claims, 13 Drawing Sheets

PROGRAMMABLE MILLIMETER WAVE RADAR INTEGRATED CIRCUIT

CROSS-REFERENCE TO RELATED APPLICATIONS

This application is a continuation application under 35 U.S.C. 111(a) of and claims priority to International Application No. PCT/US2019/024938, having an International Filing Date of Mar. 29, 2019.

FIELD

The disclosure generally relates to the processing of received radar signals in a radar system.

BACKGROUND

Radar systems operate by transmitting radar signals toward a target and detecting the reflected signals. Information that can be determined from the reflected signals include range, speed, and size (and possibly direction angle) of various objects including the target. Traditionally, long range radar has been used in association with commercial and military aircraft and similar applications. Recently, radar has found uses in relatively short range applications—detecting targets within 0.025-0.5 meters from the transmitter/detector. In such short range applications, integrating the components of a radar system in a single integrated circuit can prove advantageous.

Frequency Modulated Continuous Wave (FMCVV) signals are used to measure range with high accuracy. In an FMCW system, the transmitted signal consists of a continuous wave carrier which is modulated by a periodic function. A common example is a sawtooth waveform. In that case, the carrier increases linearly in frequency over a fixed period of time to create the sawtooth waveform. Frequency differences between the receive signals and the transmit signals increase with delay, and hence with target range may be determined.

A Doppler system uses a static (i.e., non-modulated, or non-sweeping) frequency carrier signal and has received signals at 0.01 to 1 kHz offset from carrier, depending on the velocity of the target. Such a system is used primarily to measure the existence, speed or movement of targets, without precise knowledge of their range.

BRIEF SUMMARY

According to one aspect of the present disclosure, an integrated circuit including a radar receiver adapted to process a received radar signal is provided. The integrated circuit includes a low noise amplifier adapted to be connected to a receiver antenna structure. The integrated circuit also includes a first programmable gain amplifier. The integrated circuit also includes a first programmable bandpass filter. The integrated circuit also includes a second programmable gain amplifier. The integrated circuit also includes a second programmable bandpass filter. The integrated circuit also includes a programmable low pass filter.

Optionally, in any of the preceding aspects the integrated circuit further includes a mixer having an input connected to an output of the low noise amplifier and an output connected to an input of the first programmable gain amplifier.

Optionally, in any of the preceding aspects the integrated circuit comprises an integrated circuit where the second programmable gain amplifier has an input connected to an output of the first programmable bandpass filter and an output connected to the second programmable bandpass filter.

Optionally, in any of the preceding aspects the integrated circuit comprises an integrated circuit where the second programmable bandpass filter has an output connected to an input of the programmable low pass filter.

Optionally, in any of the preceding aspects the integrated circuit comprises an integrated circuit further including an analog to digital converter having an input connected to an output of the programmable low pass filter.

Optionally, in any of the preceding aspects the integrated circuit comprises an integrated circuit where each amplifier includes an amplifier stage including at least two amplifier elements and at least two bypass elements.

Optionally, in any of the preceding aspects the integrated circuit comprises an integrated circuit where each bandpass filter includes a bandpass filter stage including at least two bandpass filter elements and at least two bypass elements.

Optionally, in any of the preceding aspects the integrated circuit comprises an integrated circuit wherein the output of the mixer comprises an in-phase signal and a quadrature signal, the in-phase signal and the quadrature signal representing a difference between a transmitted modulated carrier and the received radar signal.

Optionally, in any of the preceding aspects the integrated circuit comprises an integrated circuit where the first programmable bandpass filter is programmed with a lower center frequency than the second bandpass filter.

Optionally, in any of the preceding aspects the integrated circuit comprises an integrated circuit where the first programmable gain amplifier is programmed with a lower gain than the second programmable gain amplifier.

Optionally, in any of the preceding aspects the integrated circuit comprises an integrated circuit where the first bandpass filter and the second bandpass filter are programmable during receipt of the received radar signal and where the first bandpass filter and the second bandpass filter are configured to be programmed to between optimal center frequency and a maximum center frequency.

Optionally, in any of the preceding aspects the integrated circuit comprises an integrated circuit where the received radar signal is a saw tooth frequency modulated continuous-wave radar signal, and the first bandpass filter and the second bandpass filter are configured to be programmed to between optimal center frequency and a maximum center frequency during wait periods between each ramp in the saw tooth signal.

According to another aspect of the present disclosure, a method of processing a received radar signal in a radar receiver stage integrated circuit is provided. The method may comprise; selecting a radar system configuration including a system type comprising an FMCW system or a Doppler system; programming at least a first programmable gain amplifier stage to a first gain; programming a first programmable bandpass filter stage to a first center frequency; and programming a programmable low pass filter to a first LPF gain.

Optionally, in any of the preceding aspects the method further includes programming a second programmable gain amplifier to a second gain; and programming a second programmable bandpass filter to a second center frequency.

Optionally, in any of the preceding aspects the first center frequency is lower than the second center frequency.

Optionally, in any of the preceding aspects the first gain is lower gain than the second gain.

Optionally, in any of the preceding aspects the method further includes: programming the first programmable bandpass filter stage to the first center frequency during a first portion of the radar signal; programming the second programmable bandpass filter stage to the second center frequency during the first portion of the received radar signal; and programming the first programmable bandpass filter stage and the second programmable bandpass filter stage to a maximum center frequency during a second portion of the received radar signal.

Optionally, in any of the preceding aspects the received radar signal is a saw tooth frequency modulated continuous-wave radar signal, and the first portion of the received radar signal is a ramp in the received radar signal and the second portion of the received radar signal is a wait period between ramps.

Optionally, in any of the preceding aspects the method further includes programming a second programmable gain amplifier to be bypassed; and programming a second programmable bandpass filter to be bypassed.

According to another aspect of the present disclosure, a method of operating a radar receiver adapted to receive a reflected saw tooth frequency modulated continuous-wave radar signal is provided. The method comprises: programming at least a first programmable gain amplifier stage to a first gain; programming a first programmable bandpass filter stage to a first center frequency during a first portion of the radar signal; and programming the first programmable bandpass filter stage to a maximum center frequency higher than the first center frequency during a second portion of the radar signal.

Optionally, in any of the preceding aspects, the method further includes programming a second programmable bandpass filter stage connected in series with the first programmable bandpass filter stage to the first center frequency during a first portion of the radar signal; and programming the second programmable bandpass filter stage to the maximum center frequency during the second portion of the radar signal.

Optionally, in any of the preceding aspects the radar signal is a saw tooth frequency modulated continuous-wave radar signal, and the first portion of the radar signal is a ramp in the radar signal and the second portion of the radar signal is a wait period between ramps in the radar signal.

Optionally, in any of the preceding aspects the method repeats during each cycle of the frequency modulated continuous-wave radar signal. This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying FIGS. for which like references indicate elements.

DETAILED DESCRIPTION

The present disclosure will now be described with reference to the figures, which in general relate to an integrated circuit providing optimal radar reception for a number of different radar systems and configurations. The technology provides a single integrated circuit that can be configured by software to provide optimum receiver stage performance for multiple variants of frequency modulated continuous-wave (FMCVV) radar systems as well as Doppler systems and in both type of systems incorporating either a zero offset or a non-zero offset frequency tone. Additionally, a precise "speed-up" mode is disclosed to the receiver stage to support fast sweeping in the FMCW system. The integrated circuit can be configured by software, creating the optimum performance regardless of which radar system is used and whether the transmit signal employs a frequency offset.

The integrated circuit described herein is suitable for applications using a short range FMCW radar system which may detect targets at a range of 0.025~0.5 m. Examples of applications for this type of system include detecting a human hand or finger to detect, for example, fine finger and hand gestures. The frequency sweep slope of such systems may be in a range of about 8 to 64 MHz/μs, with sweep bandwidths (BVV) of up to 15 GHz. Received signals are then 1 to 200 kHz offset from the transmission offset tone (zero or non-zero). The receiver signal to noise (SNR) may be >−9 dB (in 2 MHz BW). An FMCW system with these parameters provides accurate range for stationary or moving targets.

The integrated circuit described herein is also suitable for applications using a Doppler radar system. Heart rate and breathing monitors are exemplary applications for short range Doppler systems. It should be noted that the range in Doppler systems can extend beyond 0.5 m.

A variant of both types of systems is referred to herein as "offset" FMCW and Doppler systems. In such system, the transmission stage may use an offset frequency signal (i.e., 500 kHz relative to carrier) rather than the carrier itself. This will shift the received signal by the offset. For a 500 kHz offset, for example, the received signal will be shifted to 300~499 kHz instead of the 1~200 kHz band of the zero-offset FMCW system. A similar offset occurs in a Doppler system. Such offsets are used to avoid low frequency noise inherent in all semiconductor devices used in integrated circuits.

Figure 1:
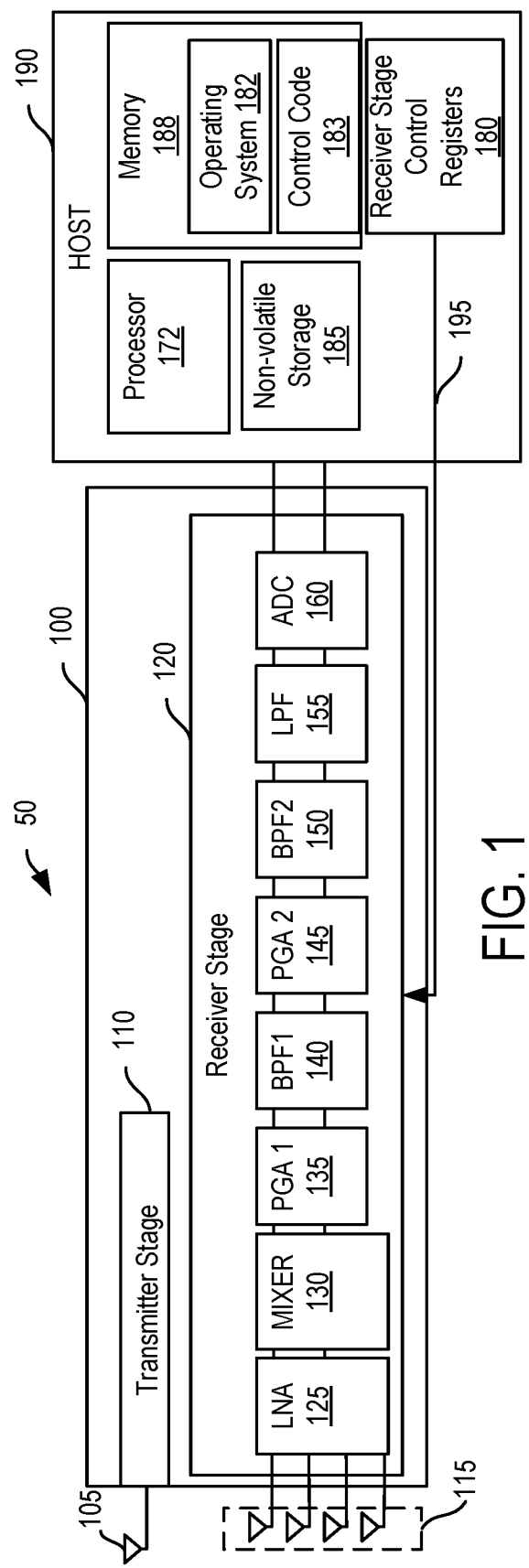
FIG. 1 illustrates a first embodiment of a radar system provided on an integrated circuit.

FIG. 1 illustrates a first embodiment of radar system 50. Radar system 50 includes an integrated circuit 100, the radar system 50 and a host 190. FIG. 1 illustrates an embodiment where the integrated circuit includes the RF front-end circuitry. In an alternative embodiment, processor 172 and receiver stage module may comprise a part of the IC 100. Integrated circuit 100 includes a transmitter stage 110 capable of outputting a radar signal at frequencies in the range of 56-71 GHz via an output antenna structure 105. In FIG. 1, antenna structure 105 is illustrated as a single antenna element. However it should be understood that the configuration of the output antenna structure 105 may vary and comprise any suitable antenna structure adapted to output radar signals from the transmitter stage 110. In addition, although the output antenna structure 105 is illustrated as external to the integrated circuit 100, the antenna structure may be formed into the integrated circuit 100. In this FMCW radar solution, the transmitted signal is a linear frequency-modulated continuous wave (L-FMCW) sequence, whose frequency vs. time characteristic follows a stepped sawtooth pattern shown in FIG. 5. Each cycle of the modulation is applied at a new step in the carrier frequency. In a FMCW radar implementation, a radio frequency carrier (RF carrier, stepped or not) in the transmit stage is modulated via a sawtooth pattern, generating a linear frequency-modulated continuous wave local oscillator, which is amplified and transmitted from the output antenna stage 105.

The radar system 50 also includes a receiver stage 120 which is adapted to detect reflected signals transmitted by the transmitter stage 110. As illustrated in FIG. 1, four individual antennas elements may comprise antenna stage 115. As discussed below, each element is selectable by the receiver stage 120. Receiver stage 120 includes a low noise amplifier stage 125, a mixer stage 130, a first programmable gain amplifier stage 135, a first programmable bandpass filter stage 140, a second programmable gain amplifier stage 145, a second programmable bandpass filter stage 150, a low pass filter stage 155, and an analog-to-digital converter stage 160. The output of the analog-to-digital converter is connected to a host 190.

The stages are connected in series, and in one embodiment the order of the stages in series is a unique aspect and provides unique flexibility in the receiver stage 120.

The host 190 may optionally include a processor 172 which is operable to execute code instructing the processor to program the various components of the receiver stage 120 in accordance with any of the various configurations and operations described herein. Host 190 may further include non-volatile storage 185 and system memory 188. The non-volatile storage may store code 183 and other data for use by the processor 172 in system 188. System memory 188 is illustrated as including an operating system 182, code 183 comprising instructions executable by the processor 172 to implement any of the processes described herein, and receiver stage control registers 180 which provide control signals 195 to program the elements of the receiver stage 120, described below. In one embodiment, processor 172 may comprise a dual core processor, having both a general purpose processor core and a digital signal processor (DSP) core. Code 183 is executable on one or both cores to control the IC 100. Although not illustrated, control lines from the host are provided to the transmit stage 110 and may include a digital-to-analog converter in the transmit stage signal path. The control code 180 instructs the programming of the receiver stage elements described with respect to FIG. 3.

Figure 2:
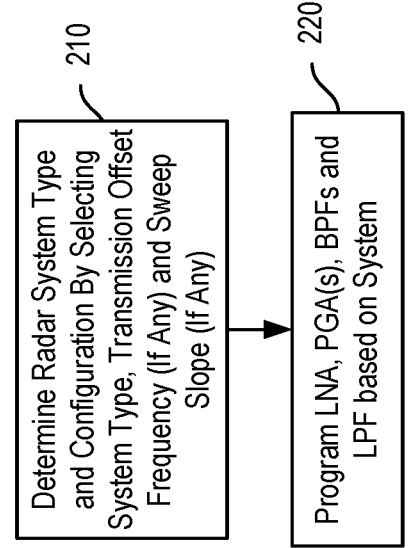
FIG. 2 illustrates a flowchart of a method for configuring the receiving radar system of FIG. 1
Figure 4:
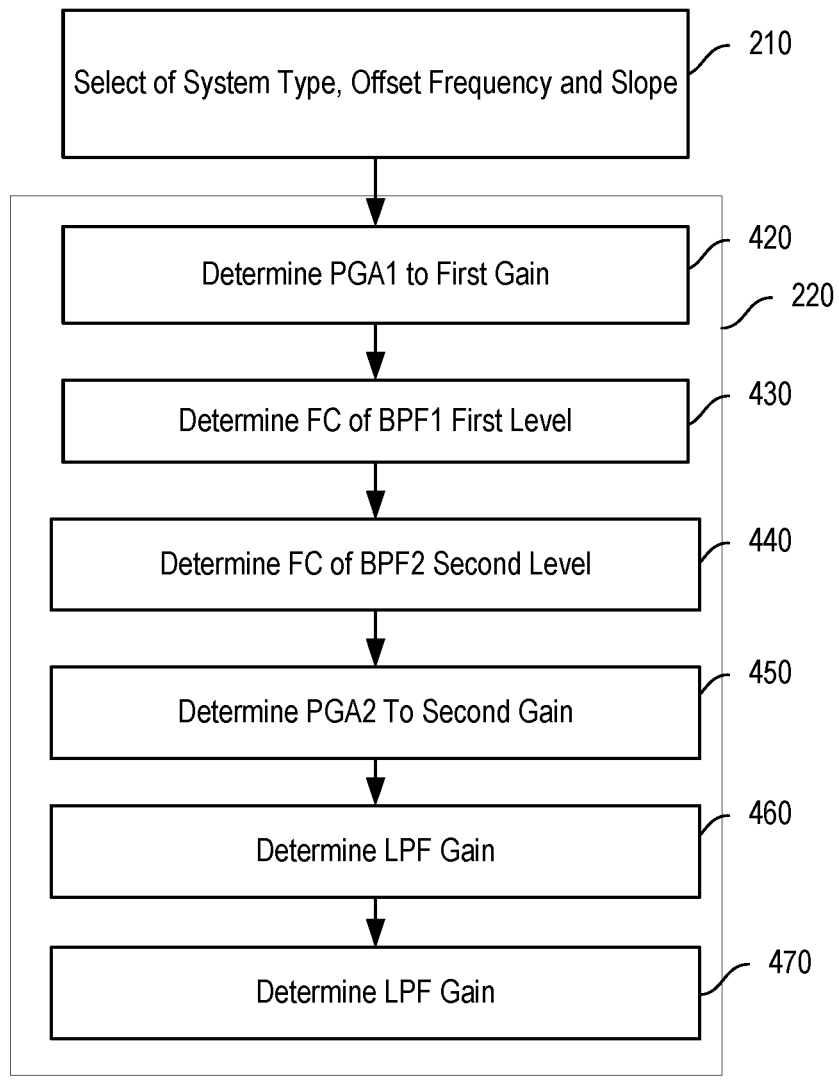
FIG. 4 is a flowchart illustrating one step in the method of configuring the radar system of FIG. 2.

FIG. 2 shows a method for configuring the receiver stage 120 shown in FIG. 1. At 210, a choice is made as to the type of radar system and configuration (offset or non-offset, and if a FMCW system, the sweep slope) that is to be used by the host system. At 220, the low noise amplifier, programmable gain amplifiers, bandpass filters and low pass filter are programmed to implement the chosen system. FIG. 4 and the accompanying description describe one embodiment for programming these elements. Various configurations of the receiver stage for different types of systems are disclosed herein.

Figure 3:
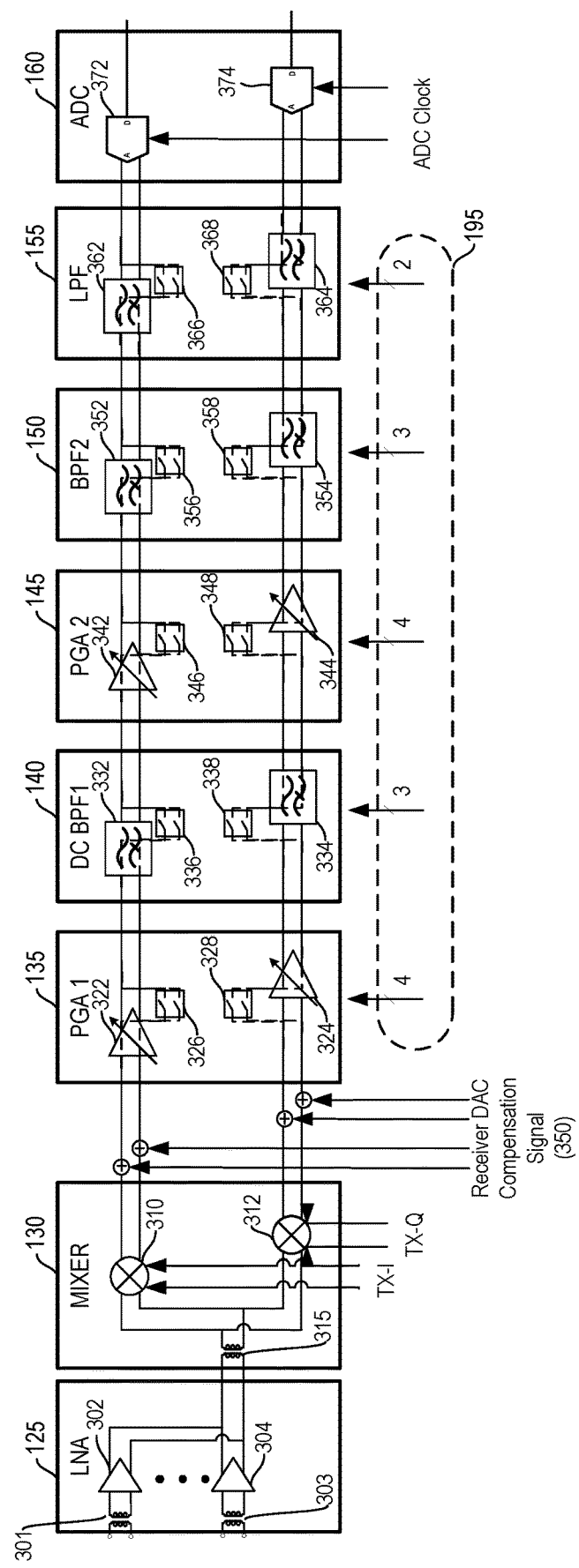
FIG. 3 is a block diagram of the receive channel of the radar system of FIG. 1.

FIG. 3 is a more detailed diagram of the receiver stage 120 of FIG. 1 showing the analog components of each stage. The circuitry described herein is for a differential quadrature phase receiver. In the receiver stage 120, a low noise amplifier stage 125 includes four low noise amplifiers (or amplifier elements), two of which—amplifier 302 and amplifier 304 are shown. Each amplifier (302, 304) is selectively enabled to allow a choice of one of the four antenna elements (connections to two of which are illustrated). A single antenna element (not shown in FIG. 3) for each low noise amplifier 302-304 is provided and is connected via a transformer 301, 303 associated with each amplifier 302-304. More or fewer antenna elements and low noise amplifiers may be used in accordance with the technology.

Each low noise amplifier in the low noise amplifier stage 125 may have a gain of 21 dB+/−2 dB with a noise figure of 6 dB+/−2 dB, but the technology should not be construed as limited to the aforementioned gain and noise parameters. The low noise amplifier outputs the received signal from the selected element to the mixer stage 130.

The output of the low noise amplifier stage 125 is connected to a mixer stage 130. The mixer stage 130 is used to remove the RF carrier thus creating an intermediate frequency. The mixer stage 130 is not programmable in one embodiment. The mixer stage 130 includes a transformer element 315 coupling the low noise amplifier stage 125 to mixers 310 and 312. The mixer stage outputs an in-phase component of the received signal from the low noise amplifier and a quadrature component of the received signal. Each mixer 310, 312 has a gain of −4 dB+/−2 dB with a noise figure of 6 dB+/−2 dB. Mixer 310 receives an input from the transmit stage local oscillator in-phase signal path while mixer 312 receives an input from the transmit stage local oscillator quadrature signal path. The received signal from the low noise amplifier stage 125 mixes with in-phase and quadrature outputs of the local oscillator from the transmit stage, which removes the RF carrier, leaving in-phase (I) and quadrature (Q) channels in the receiver stage for further processing. These in-phase and quadrature signals contain the target information and any frequency offset (zero or non-zero).

The output of the mixer stage is summed with a receiver digital-to-analog (DAC) compensation signal 350 prior to input to the first programmable amplifier stage 135. As is generally known, depending on the isolation between the transmit antenna stage 105 and the receive antenna stage 115, there may be interference between the transmitted and received signals in a radar system. Such self-interference may be partially or fully cancelled by the compensation signal from the receiver compensation DACs (not shown) via the receiver compensation signal 350.

The first programmable gain amplifier stage 135 includes a first programmable differential operational amplifier (or amplifier element) 322 and bypass switch (or bypass element) 326 and a second programmable differential operational amplifier 324 and bypass switch 328. Gain in each programmable differential operational amplifier 322, 324 is programmable between 3 and 30 dB in 3 dB steps (+/−1 dB) and each amplifier has an equivalent input noise of 16 (+/−4) nV/rtHz. A 0 dB bypass state is also available via the bypass switches 326, 328.

The first programmable bandpass filter stage 140 includes a first bandpass filter (or filter element) 332 and bypass switch (or bypass element) 336 and a second band bass filter 334 and bypass switch 338. Each filter has a center frequency (Fc) which is programmable between 50~400 kHz in binary steps (1×, 2×, 4×, 8×). A 600 kHz state is also available, used as the "Max center frequency" state for a unique speed-up mode of operation, described below. Each programmable bandpass filter 332, 334 has equivalent input noise of 90 nV/rtHz at 50 kHz and a value of 41 nV/rtHz at 400 kHz. A 0 dB bypass state is also available.

The second programmable gain amplifier stage 145 includes a first programmable differential operational amplifier 342 and bypass switch 346 and a second programmable differential operational amplifier 344 and bypass switch 348. In one embodiment, amplifier stage 145 is of identical design as amplifier stage 135. As with the first programmable gain amplifier stage 135, gain is programmable between 3 and 30 dB in 3 dB steps with a 0 dB bypass state also available. It should be recognized that, as described herein, during operation second programmable gain amplifier stage 145 may not be programmed to the same center frequency or bypass state as the first programmable gain amplifier stage 135.

The second programmable bandpass filter stage 150 includes a first bandpass filter 352 and bypass switch 356 and a second band bass filter 354 and bypass switch 358. In one embodiment, second programmable bandpass filter stage 150 is of identical design as first programmable bandpass filter stage 140. Each filter has identical programmability to that of the first programmable bandpass filter stage 140, with identical bypass and an identical maximum center frequency capability. It should be recognized that, as described herein, during operation second programmable bandpass filter stage 150 may not be programmed to the same center frequency or bypass state as the first programmable bandpass filter stage 140.

Low pass filter stage 155 includes a first low pass filter (or filter element) 362 and bypass switch 366 and a second low bass filter 364 and bypass switch 368. Each filter has programmable gain between 0 and 6 dB in a single 6 dB step, with a 0 dB bypass state (to remove the filtering).

The analog-to-digital converter (ADC) stage 160 includes two ADCs 372 and 374 having 14 bits of amplitude quantization. Each is responsive to an ADC clock which in one embodiment may run at 96 MHz. The output of ADC 372 is the digitized in-phase signal and the output of ADC 374 is the digitized quadrature signal.

Control code 183 controls programming of each of the elements by writes to the receiver stage control registers 180. These hardware registers 180 are dedicated to control bits for each of the elements in the receiver stage 120. There can be a direct connection between the registers 180 and control signals 195, with the number of bits used to program each of the elements in the receiver stage illustrated in FIG. 3.

Additional instructions to the processor 172 control the transmit states of the transmit stage 110 via other dedicated registers (not illustrated). For example, the transmit power and the offset frequency (if any) can be programmed by the software running on the processor. A local oscillator setup is also under processor control, as part of the FMCW setup. However, the actual sweep commands to the LO may be performed by custom hardware, due to the precise timing requirements.

The numbers attached to the lines denote how many binary bits of information are necessary to control the various states. For example, first programmable gain amplifier stage 135 and second programmable gain amplifier stage 145 have 10 gain states available plus one bypass state, and thus 4 bits are needed to cover all states. Similarly, first programmable bandpass filter stage 140 and second programmable bandpass filter stage 150 require 3 bits each to cover the 5 center frequencies, plus 1 bypass state. The low pass filter 155 uses 2 bits to cover the 2 gain states plus a bypass state.

FIG. 4 illustrates a method of programming the receiver stage. FIG. 4 may illustrate one embodiment of step 220 of FIG. 2. At 210, on selection of three variables including the radar system type, the offset frequency (if any) and the sweep slope (if any) are selected. Based on choices in 210, the following is known: (a) the type of system being programmed; FMCW or a continuous wave system; (b) the offset frequency value, if any; (c) if FMCW is being implemented, the sweep (i.e. ramp) rate, (d) the transmit power and TX-to-RX antenna leakage, (e) the desired transient settling time; and (f) the expected target range (up to 0.5 m for finger gesture recognition, for example). With given parameters (a), (b), (c) and (f) and via well-known radar calculations, the expected target frequency seen at the receiver will be known. (Any offset frequency (b) is added to the expected target frequency at the receiver.) And from (d), the self-interferer amplitude is known.

In configuring the receiver stage, optimization and analysis of important receive channel performance parameters may be performed in system link budget simulations to derive Table 1 (below), assuming zero offset in the FMCW system. A similar optimization may be performed for FMCW systems with non-zero offset. The items optimized for each sweep slope are: Noise Figure, Dynamic Range, Signal to Noise Ratio (SNR) and Transient Settling Time, all of which are well known parameters for any radio design. The optimization technique for programming (in FIG. 4), resulting in Table 1 and based on link budget simulations, is shown in steps 420-460.

At 420, the gain for the first programmable gain amplifier is determined from the maximum expected signal amplitude. The maximum signal amplitude is usually the self-interferer from the transmitter antenna design. In other embodiments, signal amplitude can be measured via a software gain calibration process. This software procedure sets all subsequent elements (blocks 140-155) after the first programmable gain amplifier 135 to bypass state (0 dB gain and no filtering), so the ADC (160) can measure the first programmable gain amplifier 135 output amplitude directly.

Based on the TABLE 1 value, or from calibration, the gain of the first programmable gain amplifier 135 is then set to the maximum allowed. The maximum allowed gain is one which lowers the overall receive channel noise figure, which in turn tends to increase the dynamic range At step 430, the center frequency of the first programmable bandpass filter 140 is determined based on the target frequencies expected. The center frequency should be equal to or greater than the maximum expected frequency, but as low as possible to avoid excess noise figure degradation due to signal attenuation. The goal is to have highest gain for the bandpass filter 140 at the lowest signal amplitudes. This occurs at the highest target range, where the signal amplitude is lowest and the received frequency is highest. Therefore, setting the center frequency of the first programmable bandpass filter at or slightly above this maximum expected signal frequency will help optimize the noise filter.

At 440, the center frequency of the second programmable bandpass filter 150 is determined. This center frequency must also be greater than or equal to the maximum expected signal frequency and take into account transient settling time. It is well known that band pass filters with fixed "Bandwidth-to-Fc" ratios (i.e., BW/Fc) will settle faster as center frequency increases. (An alternative term is "percent BW", which equals (BW/Fc)*100.) In order to meet the settling time criteria of (e) above (even when using the speed-up technique described herein), the center frequency of the second programmable bandpass filter 150 must be greater than center frequency of the first programmable bandpass filter 140 for low center frequency cases shown in Table 1 (i.e., 8, 16 and 32 MHz/us sweep cases). For the highest Fc case (64 MHz/µs), this restriction is not necessary.

At step 450 the gain of the second programmable gain amplifier 145 is determined by the largest amplitude signal. The largest signal at the second programmable gain amplifier 145 is likely the self-interferer, as with the first programmable gain amplifier 135. That is, even though the first programmable bandpass filter 140 is attenuating this undesired signal (which exists at low frequency), it is still larger than the desired target signals at any frequency. Therefore, the gain of the second programmable gain amplifier 145 is then set to the maximum allowed. The criteria is chosen to avoid any saturation or excess distortion in the second programmable gain amplifier 145.

At 460, the gain of the low pass filter 155 is usually fixed at 6 dB, but in extremely high self-interference cases it could be set to 0 dB to avoid saturation or distortion at its output.

At this point, the values (center frequency and gain) are available for programming. Using the choices shown in the Table 1 (or from in-field calibration), at 470 programming of the values determined in 420-460 is performed via code 183 (running on processor 172). The result is all optimized center frequencies and gains are set prior to the sweep. Programming of filter center frequency and programmable amplifier gain is accomplished by well-known techniques.

The programmable receiver stage 120 addresses a number of issues.

Figure 5:
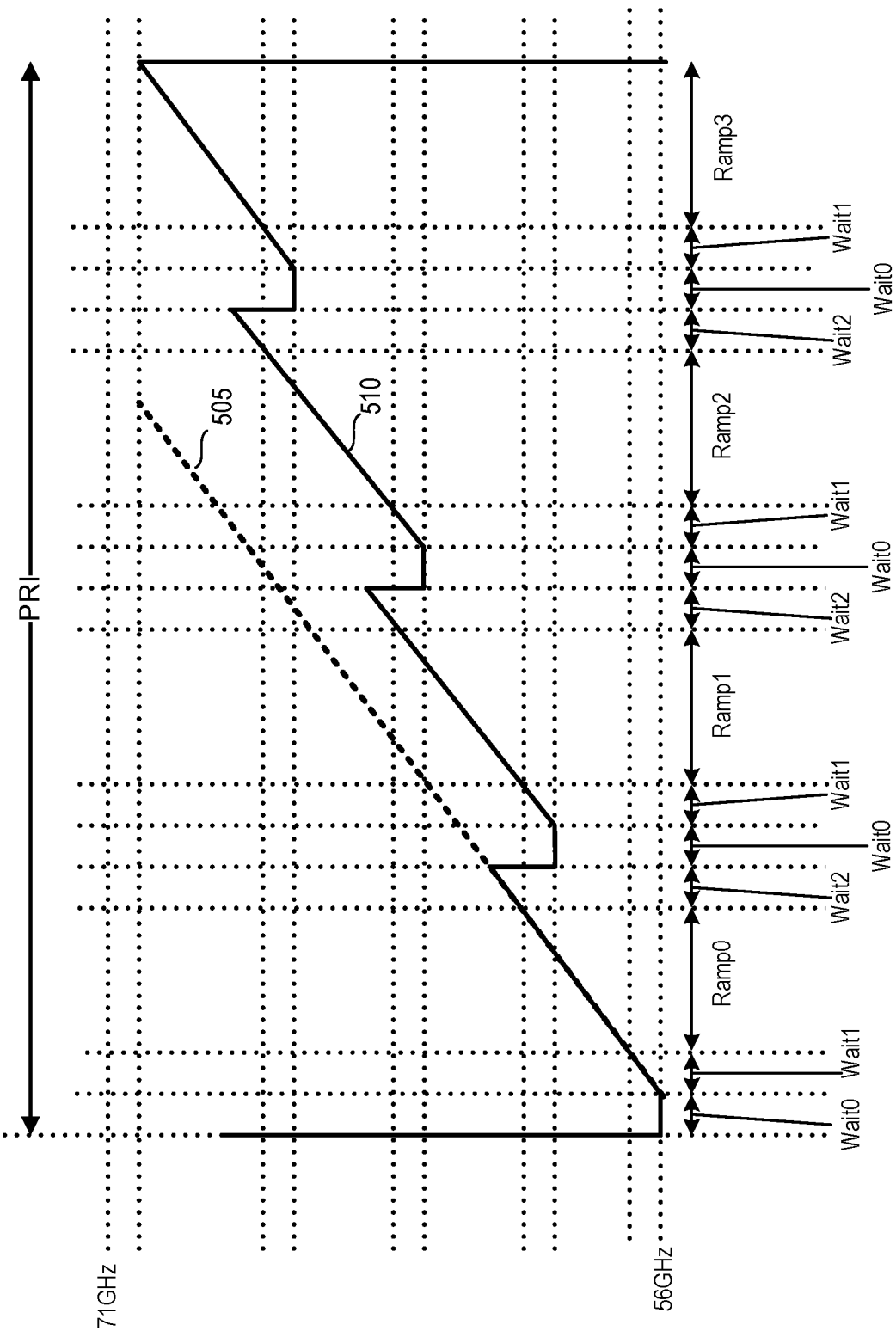
FIG. 5 is a graph of frequency vs. time illustrating a transmit signal in a frequency modulated continuous-wave radar system.
Figure 6A:
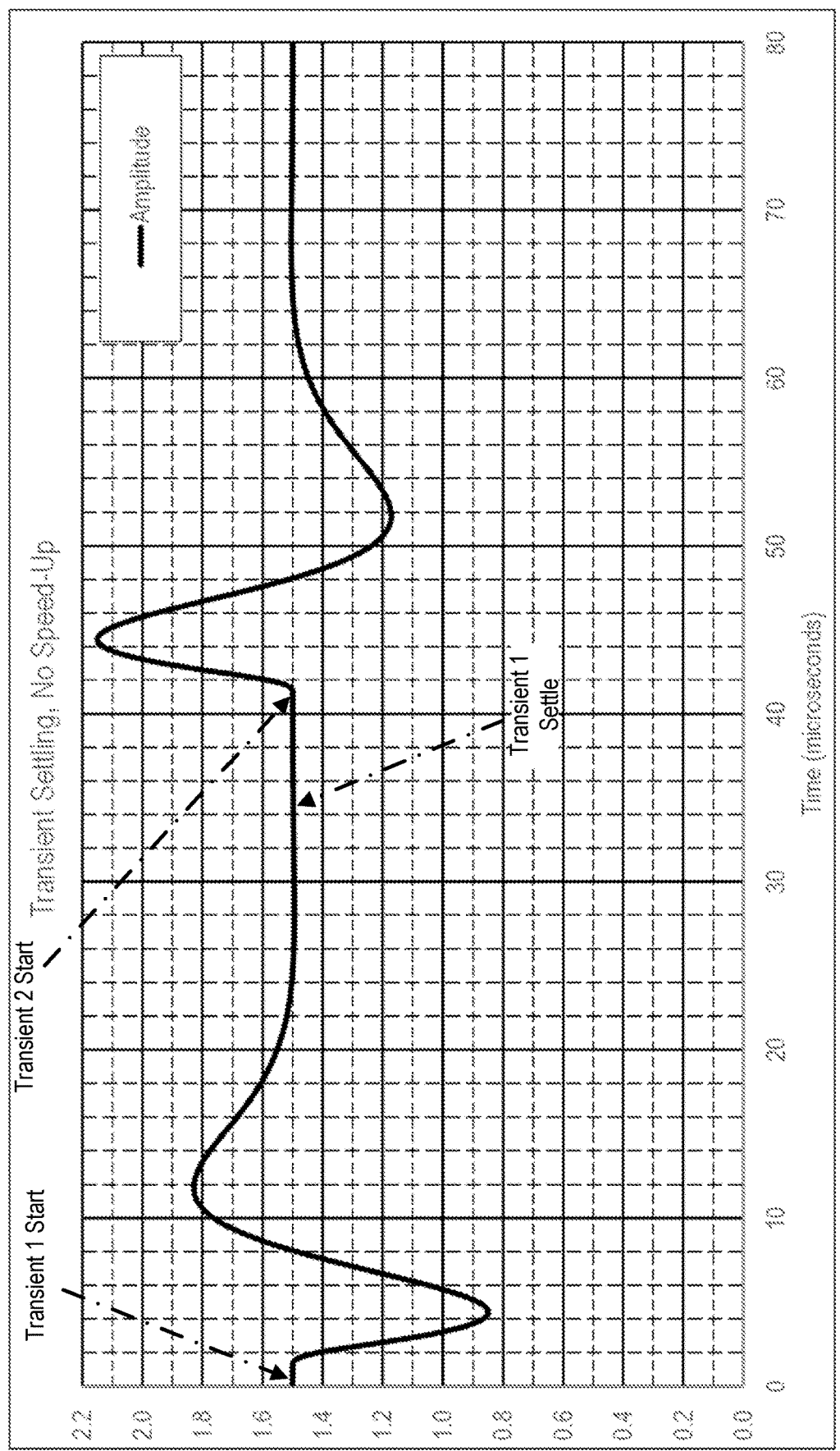
FIG. 6A is a graph of the output voltage of the low pass filter stage relative to time in a frequency modulated continuous-wave radar system.
Figure 6B:
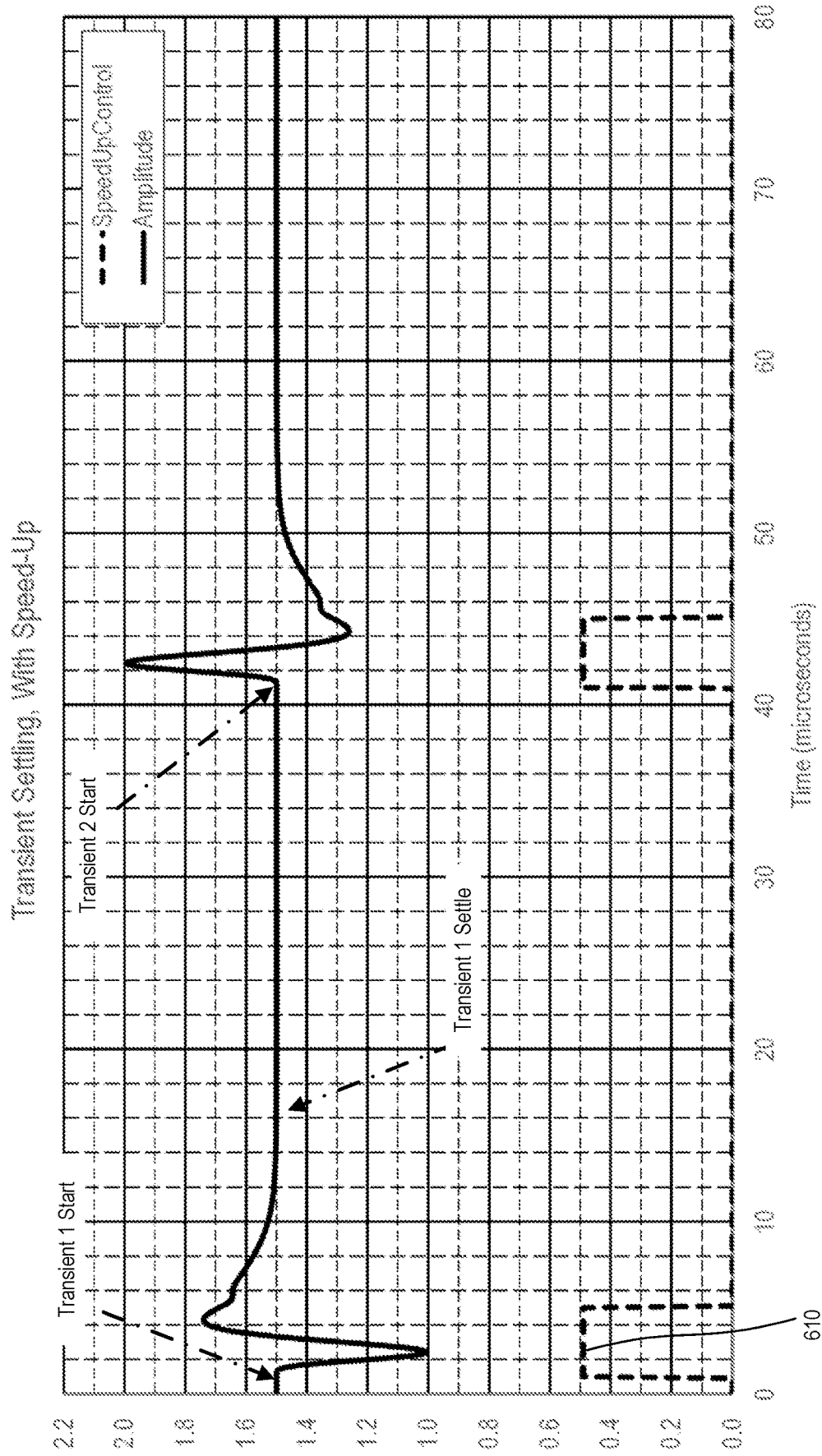
FIG. 6B is a graph of the output voltage of the low pass filter stage relative to time in a frequency modulated continuous-wave radar system using a speed-up technique in accordance with the present technology.
Figure 7:
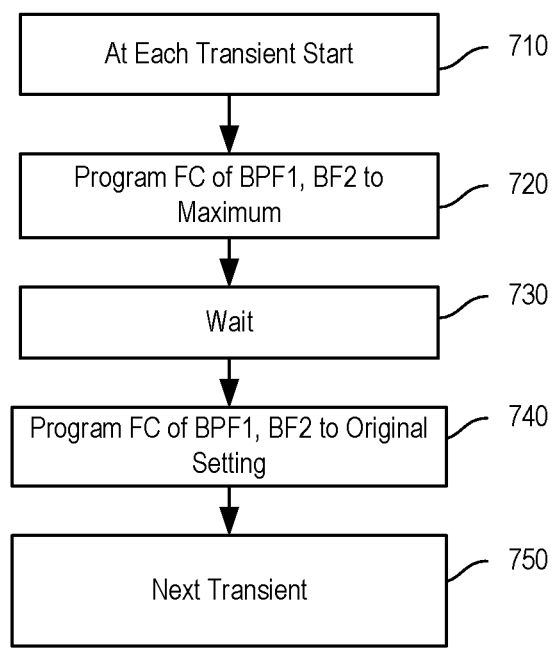
FIG. 7 is a flowchart of the speed up method for operating a receiver stage of a radar system.

FIGS. 5-7 illustrate the one issue addressed by the programmable receiver stage and a first configuration and operation of the programmable radar integrated circuit receiver stage 120. A first issue addressed is FMCW transient settling (FMCW signaling). FIG. 5 is a graph of frequency vs. time illustrating a transmit signal in a frequency modulated continuous-wave radar system.

With reference to FIG. 5, during a multi-GHz (requiring multi-segments, each stepped) sweep of an FMCW transmit signal 510, the transmission stage sweep modulation is gated off and on during wait times (Wait0) of the signal 510. Wait0 is used for stepping the RF carrier frequency in preparation for a new segment using a new starting point. An overall sweep from 56 to 71 GHz may occur in 256 µs. The non-signaling transient (caused by the gating) must settle to a steady state value at the receiving stage output in a small fraction of 256 µs. An objective is thus for fast receive stage settling during transient portions of each segment. This allows fast signal slopes since less time is spent waiting for transient settling and more time is spent measuring desired signals. Fast signal slopes can improve range resolution of the radar target.

As illustrated in FIG. 5, an ideal transmit radar signal 505 would be a linear frequency ramp (i.e., chirp) from the start of Ramp0 to the end of Ramp3. That is, the frequency would increase linearly, without any discontinuities, between those points. Such a sweep would then repeat over and over during the radar measurement, per the sawtooth modulation. For extremely wide frequency sweeps, however, hardware limitations require each sweep to be broken up into linear stepped segments, illustrated in FIG. 5 as four segments: Ramp0, Ramp1, Ramp2 and Ramp3. However, it should be noted that there may be any number from 2 to N segments in alternative embodiments.

At the start of each ramp segment (beginning of "wait0" time window), a discontinuity exists. This discontinuity is ignored in the receiver stage processing, since linearity in the overall sweep is paramount. The receiver stage must ignore the "wait2", "wait0" and "wait1" time windows in order to allow a piecing together of all segments into a completely linear sweep from end to end. Each discontinuity shown at the beginning of a "wait0" window causes a transient spike in the receiver stage signal. The spike must settle during the combined "wait0" and "wait1" time windows while the receiver is not processing data. Otherwise, the segmented sweep will not appear linear from end to end after reconstruction.

The transient spike is illustrated in FIG. 6A which is a graph of the voltage output by LPF items 362 or 364 of LPF 155 relative to time. In FIGS. 6A and 6B, the x-axis is time in seconds. The y-axes scale shown is for relative analysis, as these exact voltages may or may not exist in the embodiment. Two transients are shown, but the 40 microseconds between transients does not necessarily represent the actual system sweep timing. FIG. 6A is an illustration of the transient settling between a non-speed-up case versus the speed-up method illustrated in FIG. 6B.

Fast bandpass filter stage settling during the transient periods (between linear ramp segments) allows shorter overall sweep times. Short sweep times provide more sweeps per second for more target data collection. This data can then be averaged over shorter processing periods to increase the accuracy of target parameters such as range or motion.

In a unique feature of the technology, a "speed up" method of operating the receiver stage illustrated in FIGS. 6B and 7 is provided. The speed-up method has the effect of decreasing the transient settling time of the received signal path, specifically the bandpass filter stages in a FMCW System (with no transmit signal offset frequency). In order for the receiver signal path to settle within the "wait0" and "wait1" time windows, the bandpass filters stages should have a high center frequency. In actual realization, the center frequency needed for optimum radar performance may be too low to settle during this time, which may be only 10~20 μs. FIG. 7 is a method of switching the center frequency of each bandpass filter from the optimum radar center frequency to a much higher center frequency during the transient, then back to the optimum radar center frequency.

Prior to the method of FIG. 7, each bandpass filter will be programmed (in accordance with FIG. 4) to its operational setting based on the configuration of the receiver stage for the given radar application. In FIG. 7, at each transient start at 710, the center frequency of each bandpass filter stage 140, 150 is programmed to maximum (i.e. Max FC) which in the above embodiment is 600 kHz. After a short wait (which in one embodiment is equivalent to the Wait0 time period) at 730, each center frequency is programmed to its original setting 740 (based on the selected mode of operation of the receiver stage), and the method waits for the next transient at 750. In another embodiment, the wait time 730 corresponds to a pulse shown in FIG. 6 as 610. During the pulse ON state, the center frequency is programmed to maximum. The pulse of 610 may or may not correspond equivalently to the duration of Wait0.

FIG. 6B illustrates a corresponding maximum frequency "pulse" 610 during which the bandpass filter is set to a maximum center frequency in relation to the transients and how the pulse affects the transient period. FIG. 6B illustrates the fast bandpass filter settling during the transient periods (between linear ramp segments). In one embodiment, the maximum center frequency is used only during the "wait0" window, where the transient spike will settle near its final value. Then, at the beginning of "wait1", the center frequency is switched back to the programmed value, where it is allowed to completely settle prior to the next linear ramp segment. In another embodiment, pulse 610 may be wider or narrower than Wait0 and/or it may start in Wait0 and end in Wait1.

In FIG. 6A, the transient spikes are fairly broad and the settling time is ~35 μs (within a few millivolts of final settled value). Applying the speed-up method as shown in FIG. 6B, the rising and falling edges of a 4 μs pulse indicate the exact instants of switching from optimum center frequency to maximum center frequency (rising edge) and back again (falling edge). This 4 μs time interval is programmable and may represent the entire "wait0" window or a fraction of it. A final value may be chosen for each system used and each sweep used. The resulting settling times shown above are ~16 μs for the speed-up case and ~35 μs with no speed up.

The speed up mode can be used in various applications, but not all applications benefit from implementing the speed-up mode. For example, in the offset FMCW system using a ~500 kHz offset, the optimum programming values for the bandpass filter stages are at or near the maximum center frequency, so no speed up is needed.

As a second issue addressed, the integrated circuit described herein also provides a programmable improvement in the receive stage dynamic range. Such improvement in dynamic range is provided by the use of programmable blocks in the receiver stage. A receiver stage system setup is defined by choosing the type of radar system (FMCW, Doppler), transmit offset frequency (0, 500 kHz), if any, and sweep slope (0, 8, 16, 32, 64 MHz/us). Optimum receiver performance (i.e. maximum achievable dynamic range (DR)) can be achieved for any system setup by proper programming of each block, where the dynamic range is the amplitude ratio between the largest and smallest signals that can be reliably processed to provide good quality results.

Figure 8:
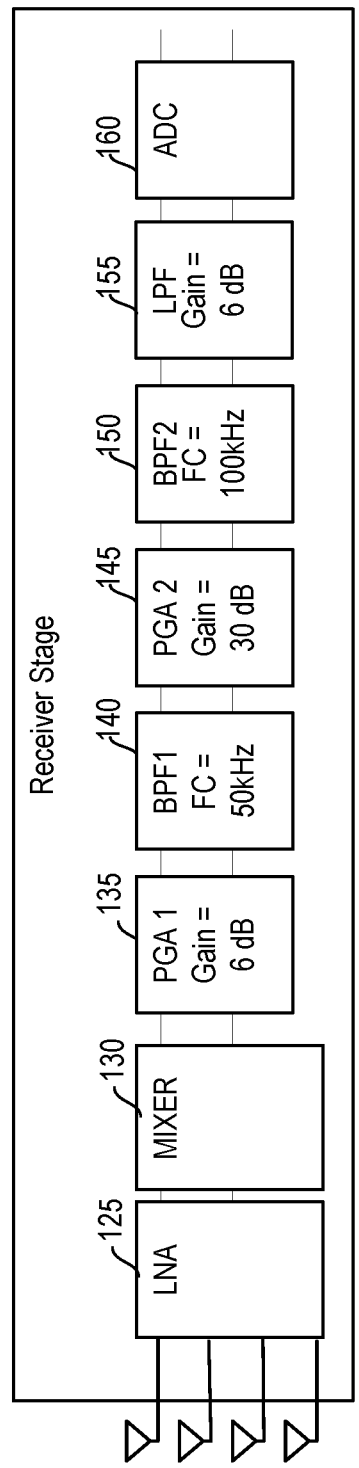
FIG. 8 is a block diagram illustrating a first programmed state of a receive stage of a radar system integrated circuit.

FIG. 8 illustrates one embodiment of a programmed receiver stage set up to implement a FMCW system with no offset and a sweep slope of 8. As shown in FIG. 8, the first programmable gain amplifier stage 135 has a programmed gain of 6 dB, the first programmable bandpass filter stage 140 has a programmed central frequency of 50 kHz, the second programmable gain amplifier stage 135 has a programmed gain of 30 dB, the second bandpass filter stage 150 has a programmed central frequency of 100 kHz, and the low pass filter stage 155 has a programmed gain of 6 dB.

Although the first programmable bandpass filter stage 140 has a programmed central frequency of 50 kHz, it should be recognized that each programmable bandpass filter stage 140, 150 may be operated in the speed up method of FIG. 7. Additional examples of programmed receiver stages are illustrated in FIGS. 9 and 10.

Figure 9:
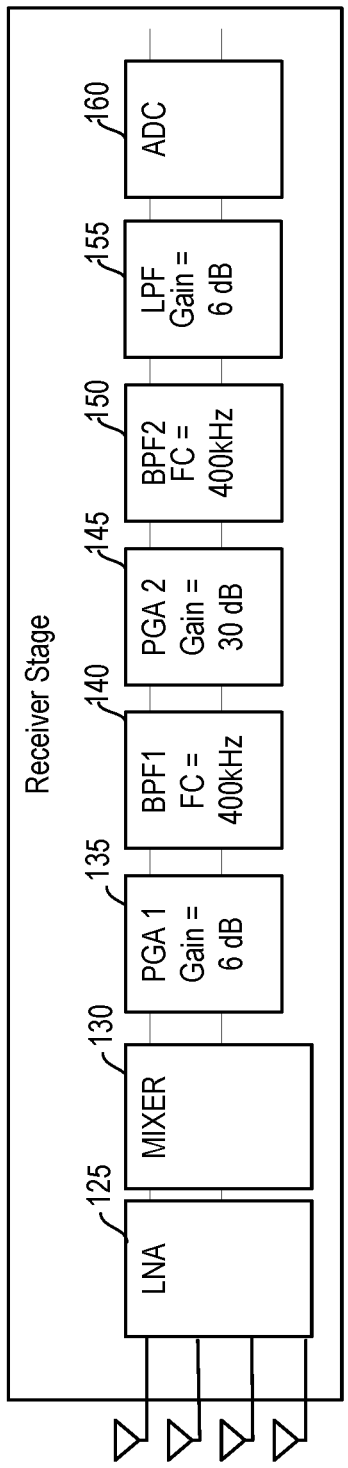
FIG. 9 is a block diagram illustrating a second programmed state of a receive stage of a radar system integrated circuit.

FIG. 9 illustrates a programmed receiver stage 120 for a FMCW system with no offset and a sweep slope of 64. FIG. 10 illustrates a receiver stage for a radar system with an offset of 500 kHz and a sweep slope of 8. In the embodiment of FIG. 10, the sweep slopes become irrelevant due to the offset so the system is equivalent to a Doppler system configuration with a 500 kHz offset. As noted above, in an offset FMCW system, the optimum settings for the bandpass filter stages are at or near maximum center frequency, so no speed up is needed. Other receiver states are available, but not shown above.

Figure 10:
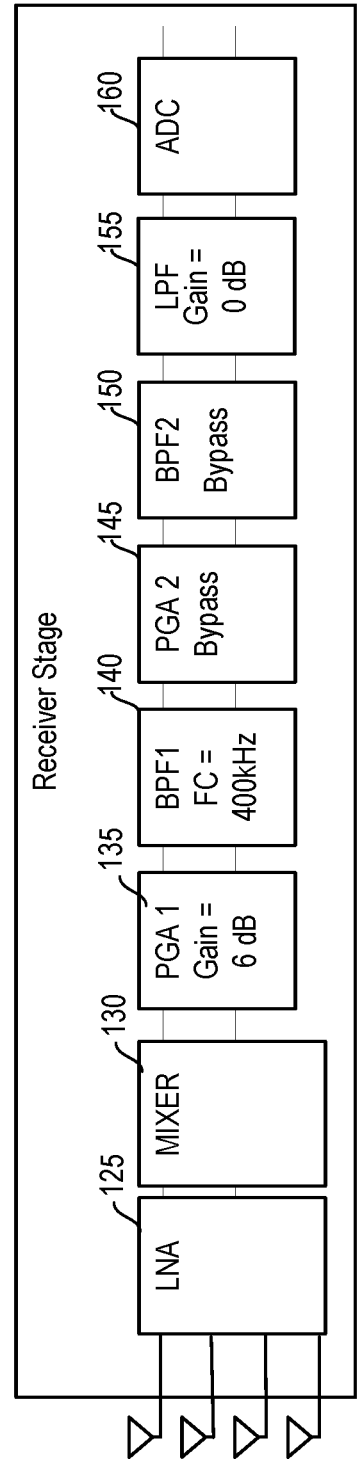
FIG. 10 is a block diagram illustrating a third programmed state of a receive stage of a radar system integrated circuit.

Even though the gain of the first programmable gain amplifier stage 135 is set at 6 dB in all examples in FIGS. 8-10, it should be noted that the gain of the first programmable gain amplifier stage 135 will actually be determined by two factors: transmit antenna stage 105 to receiver antenna stage 115 isolation and/or the amount of cancellation provided to the first programmable gain amplifier stage 135 by the receiver DAC compensation signal 350. With respect to transmit/receiver stage isolation, since the transmit stage 110 and receiver stage 120 operate simultaneously, the leakage of the transmit signal into the receiver is usually at a much higher amplitude than the desired receiver signal reflected off the radar target. This "self-interference" can cause saturation and/or distortion in the receiver signal path and reduce dynamic range (DR). Therefore the gain of the first programmable gain amplifier stage 135 is set to avoid this via a gain calibration procedure prior to radar system operation. The result is that the gain of the first programmable gain amplifier stage can be increased if the antenna isolation is higher. With respect to the amount of cancellation provided by the receiver DAC compensation signal 350, the self-interference signal may be partially or fully cancelled by the compensation signal 350 from the receiver compensation DACs (not shown). This may be performed via a digital baseband processor operation and allows higher gain in the first programmable amplifier stage 135 if more cancellation is provided.

FMCW and Offset FMCW systems operable to use the technology discussed herein may have sweep slopes ranging from 0~64 MHz/μs and are administered in binary steps (1×, 2×, 4×, . . . ), resulting in possible slopes of 8, 16, 32 and 64 MHz/us. The integrated circuit described herein thus provides a wide range of FMCW sweep slopes. Over the range of sweep slopes from 8~64 MHz/μs, targets at ranges of 0.025~0.5 m produce receiver baseband signals from 1.3~209 kHz (for the zero transmit offset case).

Another advantage of the present technology is that the bandpass filter stages may be used as range compensation filters. Range compensation means the amplitude for near targets is attenuated and the amplitude for far targets is not attenuated, resulting in a near constant receiver signal level regardless of range from the receiver.

In the FMCW system with no offset, the bandpass filter stage center frequency is greater than the maximum receiver frequency encountered in order to properly use the bandpass filter stages as range compensation filters. The amplitude slope of each bandpass filter stage, for receiver frequencies below center frequency, is chosen to be 20 dB/decade. Two bandpass filter stages in series creates 40 dB/decade, which theoretically compensates for a target at any range. Having two such bandpass filter stages in the receiver signal path allows maximum possible dynamic range, provided the available center frequencies are greater than any receiver signal frequency. In an FMCW system with zero offset frequency, with sweep slopes of 8~64 MHz/μs and a target range of 0.025~0.5 m, the receiver baseband frequencies would cover 1.3~209 kHz. However, any one sweep slope would produce only a fraction of those frequencies. For example, an 8 MHz/μs sweep slope produces receiver frequencies within 1.3~26 kHz for the specified target range of 0.025~0.5 m, whereas a 64 MHz/μs sweep slope produces receiver frequencies within 10~209 kHz. The frequencies double as the sweep slope doubles. In this embodiment, a unique center frequency is chosen for each sweep slope. This allows maximum dynamic range for each slope used.

For Offset FMCW systems, the bandpass filter stages provide no range compensation because all possible baseband receiver signal frequencies occupy much less than a single decade, regardless of sweep slope or target range. For the offset system, a single center frequency is chosen, closely matching the offset frequency. It is not based on the sweep slope, like in the zero offset FMCW system.

Figure 12:
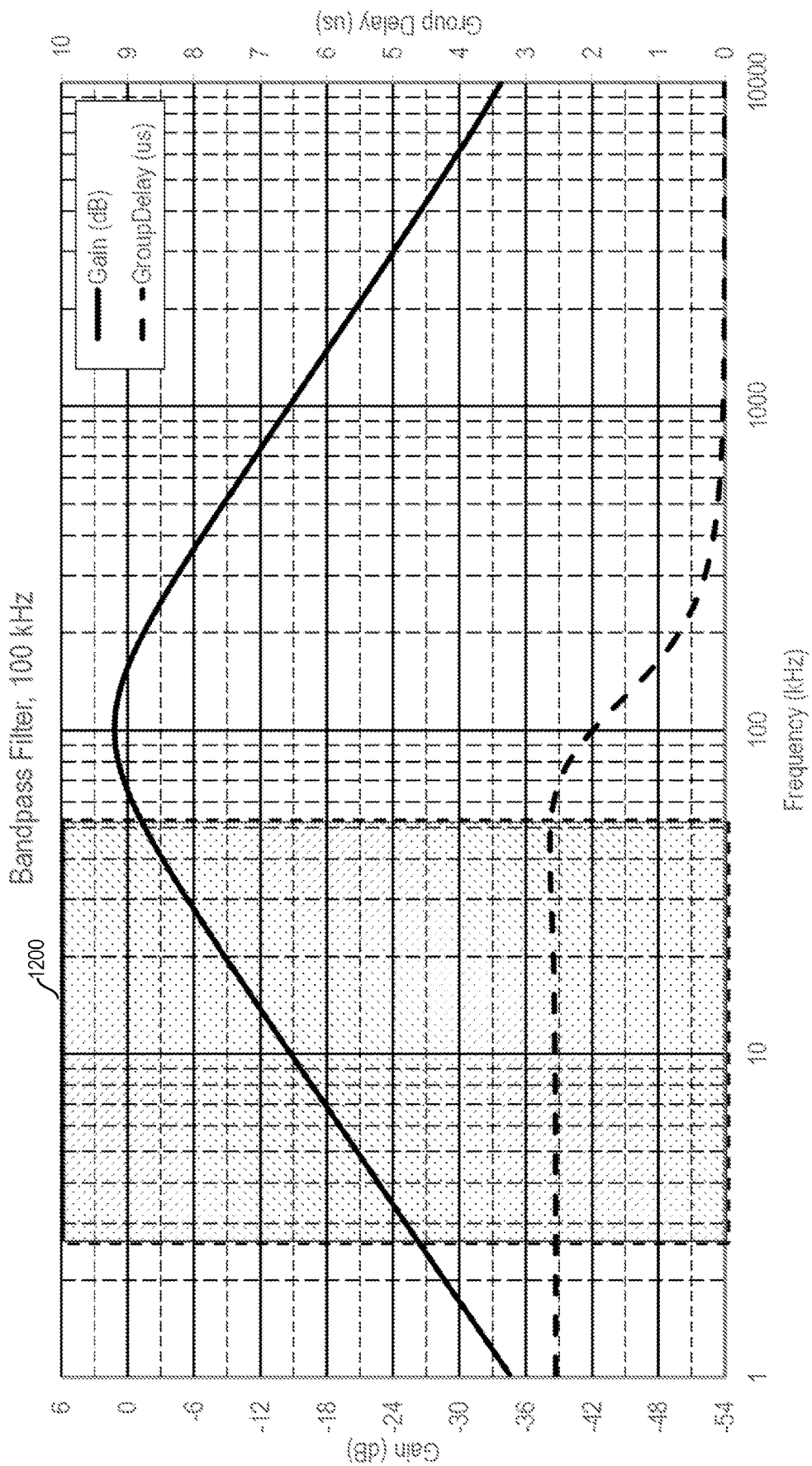
FIG. 12 is a graph illustrating chosen center frequency selection and received signal bandwidth for a bandpass filter stage for a second FMCW receiver system with 0 Hz offset.
Figure 13:
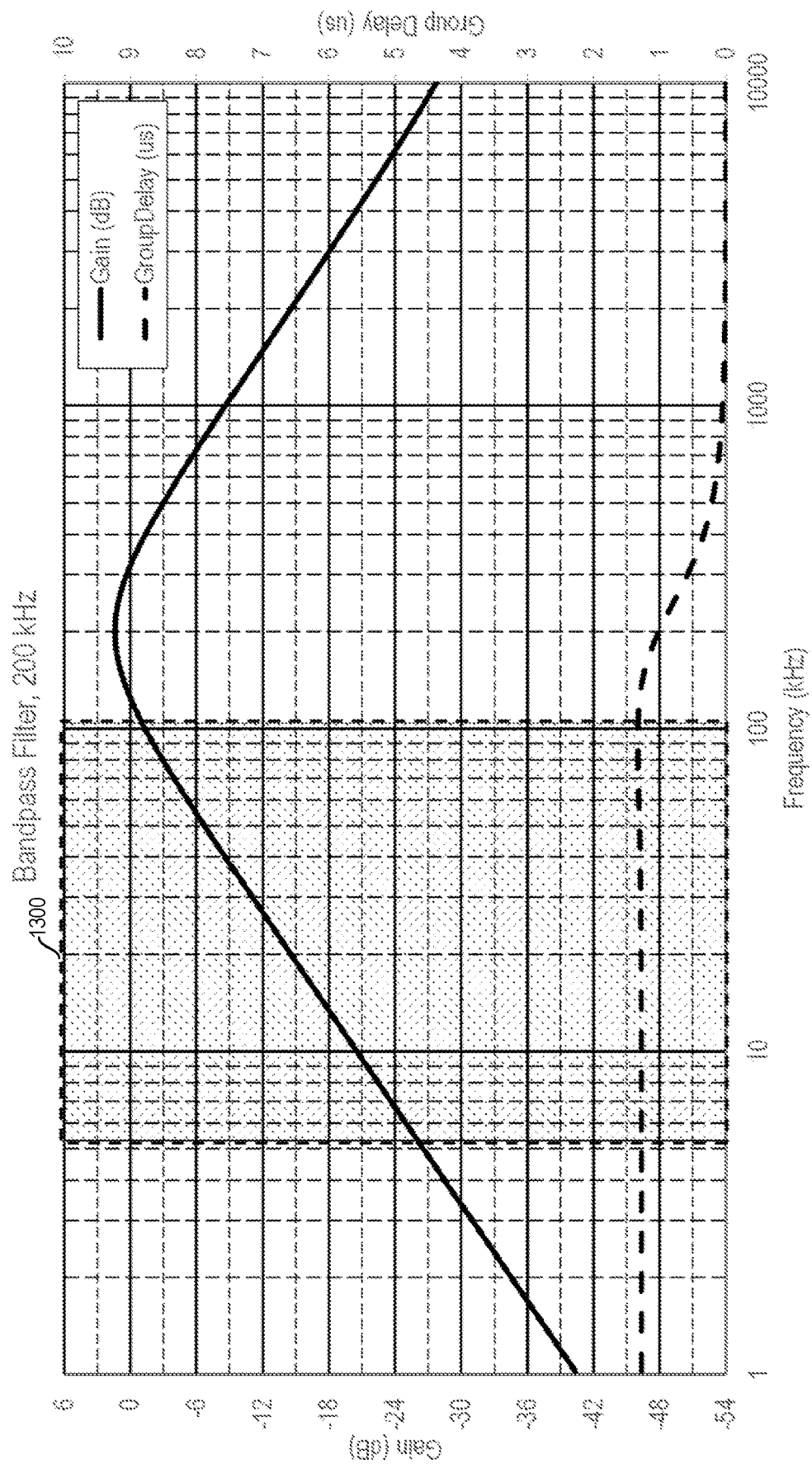
FIG. 13 is a graph illustrating chosen center frequency selection and received signal bandwidth for a bandpass filter stage for a third FMCW receiver system with 0 Hz offset.
Figure 14:
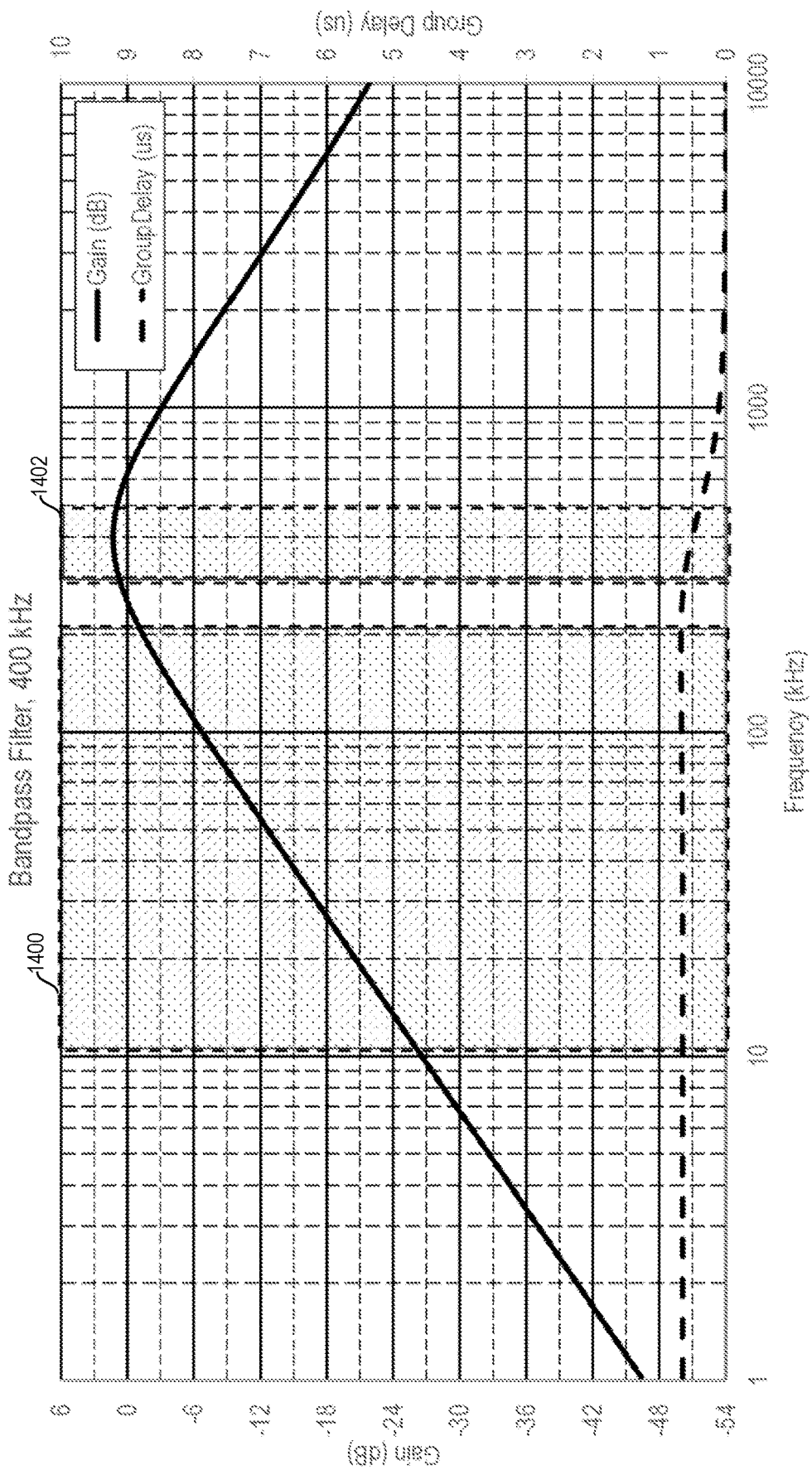
FIG. 14 is a graph illustrating chosen center frequency selection and received signal bandwidth for a bandpass filter stage for a fourth FMCW receiver system with a 0 Hz offset, as well as the received signal bandwidth for a bandpass filter stage for an FMCW receiver system with a 500 Hz offset.

FIGS. 11 through 14 show the chosen center frequency selections for the first bandpass filter stage 140 for different sweep slopes in an FMCW receiver system with 0 Hz offset. The target range is 0.025~0.5 m in all cases. FIG. 14 also shows the center frequency for any sweep slope used in an offset FMCW system, with a 500 kHz offset example. In FIGS. 11-14, the x-axis is receiver baseband frequency (Hz), the left y-axis is bandpass filter stage gain (dB) and the right y-axis is the bandpass filter stage group delay in seconds. Regarding group delay, the bandpass filter stage design is a 2nd order filter with Q=0.625 (quality factor). This allows the group delay to be relatively constant over the receiver signal frequencies used for each bandpass filter stage center frequency setting.

Figure 11:
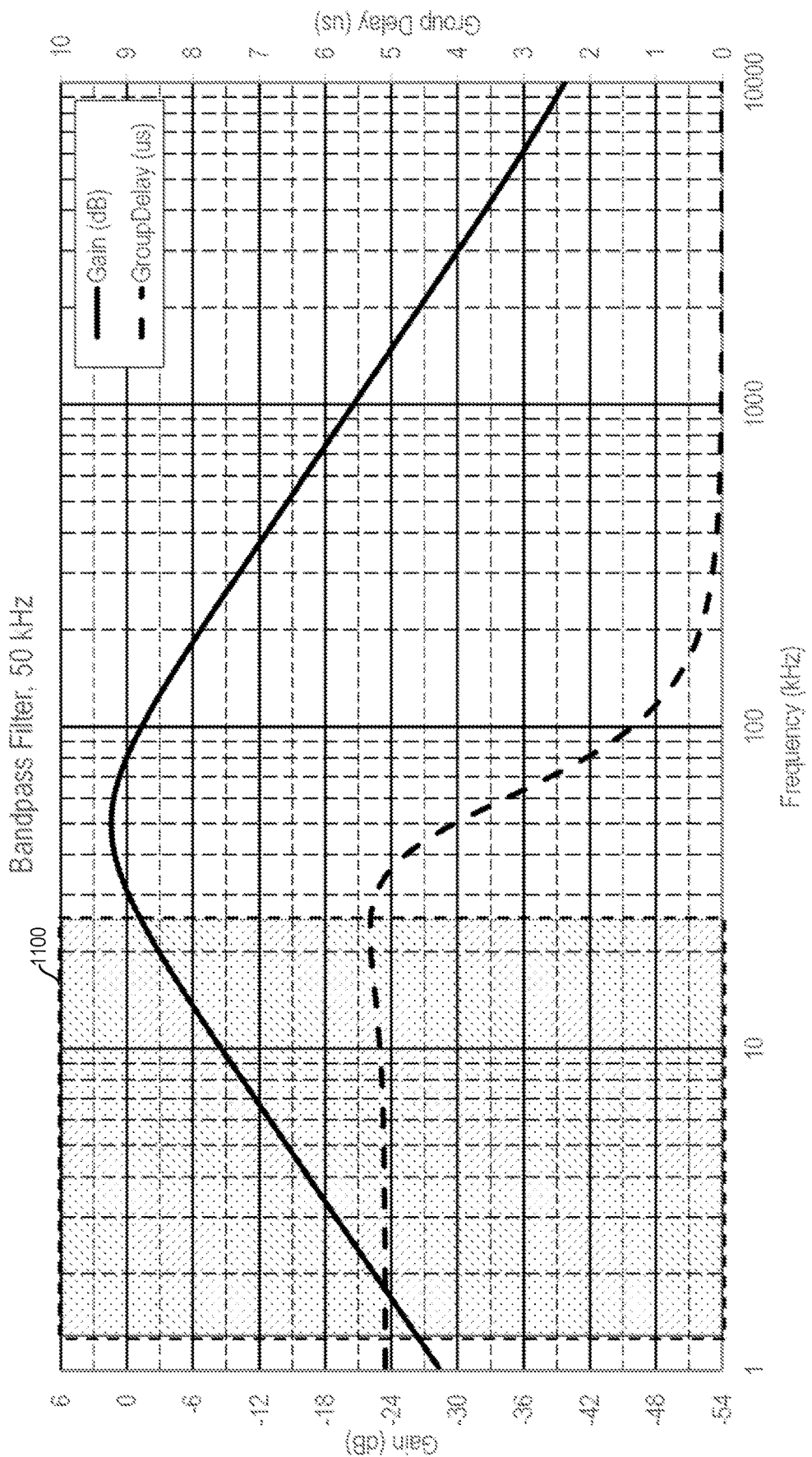
FIG. 11 is a graph illustrating chosen center frequency selection and received signal bandwidth for a bandpass filter stage for a first FMCW receiver system with 0 Hz offset (i.e., zero intermediate frequency or zero-IF).

FIG. 11 shows the range of received signal frequencies 1100 and a graph of the center frequency (50 kHz) for use with an 8 MHz/μs sweep slope.

FIG. 12 show the range of received signal frequencies 1200 and center frequency (100 kHz) for use with a 16 MHz/μs sweep slope.

FIG. 13 shows the range of received signal frequencies 1300 and center frequency (200 kHz) for use with a 32 MHz/μs sweep slope.

FIG. 14 shows the range of received signal frequencies 1400 and center frequency (400 kHz) for use with a 64 MHz/μs sweep slope and for the offset 1402 in an FMCW system using any sweep slope.

The selection of the center frequency for the second bandpass filter stage 150 may be chosen higher than for the first bandpass filter stage 140 to help with receiver transient settling time, whether speed-up mode is used or not.

In one embodiment, bandpass filter stage center frequency configurations may be as illustrated in the following table:

TABLE 1

| Sweep Slope | RX Signal (kHz) | BPF1 Fc (kHz) | BPF2 Fc (kHz) |
|---|---|---|---|
| 8 MHz/us | 1.3~26.1 | 50 | 100 |
| 16 MHz/us | 2.6~52.2 | 100 | 200 |
| 32 MHz/us | 5.2~104.4 | 200 | 400 |
| 64 MHz/us | 10.5~209 | 400 | 400 |

A possible downside of having greater center frequency for second bandpass filter stage 150 higher than for the first bandpass filter stage 140 is more signal attenuation in bandpass filter 150. The reduced signal level would normally degrade receiver dynamic range, but this can be compensated for by choosing a large programmable gain (30 dB) in the second programmable amplifier stage 135 which precedes bandpass filter stage 150 in the receiver sequence. Therefore, a second programmable amplifier stage 145 is utilized preceding the second bandpass filter 150.

The programmability of each bandpass filter stage is one aspect of the technology which allows maximum possible dynamic range, given the many possible sweep slopes which may be implemented in a radar system, and further allows optimum performance for an offset FMCW system, regardless of sweep slope.

The use of programmable blocks in the receiver signal path and the ordering of the programmable blocks allows the receiver stage to be configured into a state that provides maximum dynamic range performance, given any of the possible radar system setups that may be used in the a radar product. The ordering of stages is optimizing end-to-end noise and high dynamic range. In addition, other useful receiver states may be programmed for use in internal calibrations of the transmit and receive stages. These include a first programmable gain amplifier gain calibration, transmit I-Q balance, receiver I-Q balance and transmit local oscillator (LO) leakage calibrations.

The fixed gain low noise amplifier stage is used for low noise. The low noise amplifier stage gain is high enough to provide good overall noise figure, but low enough to avoid signal compression in the first programmable gain amplifier stage output due to a self-interferer signal. The use of the differential operational amplifiers in the programmable amplifier stages and the use of a quadrature signal path allows large receive signals when using a low power supply voltage (of, for example, less than one volt). The 14-bit ADC converters used in the analog-to-digital converter stage 160 are used to provide at least 75 dB spurious free dynamic range. The gains of the first programmable gain amplifier stage 135, a first programmable bandpass filter stage 140, a second programmable gain amplifier stage 145, a second programmable bandpass filter stage 150, a low pass filter stage 155 are calibrated based on the self-interferer level. Low gains are needed when optional "self-interferer DAC compensation" is not used. Higher gains are used when the self-interferer is cancelled at first programmable gain amplifier stage 135 input port. Each programmable gain amplifier stage 135 and bandpass filter stage is designed for lowest noise and highest linearity, avoiding distortion products that may look like actual targets. The bandpass filter stages can perform the same range compensation function as high pass filters of prior art with the additional advantage of reducing the high frequency noise. The technology thereby provides unique flexibility in that the receiver stage can be used with or without cancellation, with or without a transmit offset tone, with FMCW or CW signaling.

In a further aspect, the subject matter of the present disclosure includes means 120 for processing a received radar signal. The means 120 includes: low noise means 125 for amplifying the received radar signal, the low noise means connected to a receiver antenna; first programmable gain means 135 for amplifying an output of the low noise means; first programmable bandpass means 140 for filtering an output of the first programmable means for amplifying; second programmable gain means 145 for amplifying an output of the first programmable bandpass means; second programmable bandpass means 150 for filtering an output of the second programmable gain means; and programmable low pass means 155 for filtering an output of the second programmable bandpass means.

It is understood that the present subject matter may be embodied in many different forms and should not be construe the subject matter as being limited to the embodiments set forth herein. Rather, these embodiments are provided so that this subject matter will be thorough and complete and will fully convey the disclosure to those skilled in the art. Indeed, the subject matter is intended to cover alternatives, modifications, and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams and combinations of blocks in the flowchart illustrations and/or block diagrams can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application and to enable others of ordinary skill in the art to understand the disclosure with various modifications as are suited to the particular use contemplated.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality.

For purposes of this document, it should be noted that the dimensions of the various features depicted in the FIG's may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" item, a "second" item, and a "third" item may not imply an ordering of items, but may instead be used for identification purposes to identify different items.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An integrated circuit for processing millimeter wave radar signals, comprising:
   a low noise amplifier coupled to a receiver antenna structure;
   a first programmable gain amplifier programmable to a first gain;
   a first programmable bandpass filter programmable to a first center frequency;
   a second programmable gain amplifier programmable to a second gain;
   a second programmable bandpass filter programmable to a second center frequency; and
   a programmable low pass filter programmable to a first low pass filter (LPF) gain,
   wherein each of the first programmable bandpass filter and the second programmable bandpass filter comprises a bandpass filter stage including at least two bandpass filter elements and at least two bypass elements.

2. The integrated circuit of claim 1, further including a mixer having an input connected to an output of the low noise amplifier and an output connected to an input of the first programmable gain amplifier.

3. The integrated circuit of claim 2, wherein the output of the mixer comprises an in-phase signal and a quadrature signal, the in-phase signal and the quadrature signal representing a difference between a transmitted modulated carrier and a received radar signal.

4. The integrated circuit of claim 1, wherein the second programmable gain amplifier has an input connected to an output of the first programmable bandpass filter and an output connected to the second programmable bandpass filter.

5. The integrated circuit of claim 1, wherein the second programmable bandpass filter has an output connected to an input of the programmable low pass filter.

6. The integrated circuit of claim 1, further including an analog to digital converter having an input connected to an output of the programmable low pass filter.

7. The integrated circuit of claim 1, wherein each programmable gain amplifier comprises an amplifier stage including at least two amplifier elements and at least two bypass elements.

8. The integrated circuit of claim 1, wherein the first programmable bandpass filter is programmed with a lower center frequency than the second programmable bandpass filter.

9. The integrated circuit of claim 1, wherein the first programmable gain amplifier is programmed with a lower gain than the second programmable gain amplifier.

10. The integrated circuit of claim 1, wherein the first programmable bandpass filter and the second programmable bandpass filter are programmable during receipt of a received radar signal, and wherein the first programmable bandpass filter and the second programmable bandpass filter are configured to be programmed to between an optimal center frequency and a maximum center frequency.

11. The integrated circuit of claim 10, wherein the received radar signal is a saw tooth frequency modulated continuous-wave radar signal, and the first programmable bandpass filter and the second programmable bandpass filter are configured to be programmed to the maximum center frequency during wait periods between each ramp in the saw tooth signal, and to the optimal center frequency during each ramp in the saw tooth signal.

12. A method of processing a received radar signal in a radar receiver stage integrated circuit, comprising:

selecting a radar system configuration including a system type comprising an FMCW system or a Doppler system;

programming at least a first programmable gain amplifier stage to a first gain;

programming a first programmable bandpass filter stage to a first center frequency during a first portion of the radar signal;

programming a second programmable gain amplifier to a second gain;

programming a second programmable bandpass filter stage to a second center frequency during the first portion of the received radar signal;

programming the first programmable bandpass filter stage and the second programmable bandpass filter stage to a maximum center frequency during a second portion of the received radar signal; and programming a programmable low pass filter to a first low pass filter (LPF) gain.

13. The method of claim 12, wherein the first center frequency is lower than the second center frequency.

14. The method of claim 13, wherein the first gain is lower gain than the second gain.

15. The method of claim 12, wherein the received radar signal is a saw tooth frequency modulated continuous-wave radar signal, and the first portion of the received radar signal is a ramp in the received radar signal and the second portion of the received radar signal is a wait period between ramps.

16. A method of processing a received radar signal in a radar receiver stage integrated circuit, comprising:

selecting a radar system configuration including a system type comprising an FMCW system or a Doppler system;

programming at least a first programmable gain amplifier stage to a first gain;

programming a first programmable bandpass filter stage to a first center frequency;

programming a second programmable gain amplifier to be bypassed;

programming a second programmable bandpass filter to be bypassed; and programming a programmable low pass filter to a first low pass filter (LPF) gain.

* * * * *